US011657325B2

(12) United States Patent
Jeong et al.

(10) Patent No.: US 11,657,325 B2
(45) Date of Patent: May 23, 2023

(54) APPARATUS AND METHOD FOR AUGMENTING TRAINING DATA USING NOTCH FILTER

(71) Applicants: Electronics and Telecommunications Research Institute, Daejeon (KR); Kyungpook National University Industry-Academic Cooperation Foundation, Daegu (KR)

(72) Inventors: Young Ho Jeong, Daejeon (KR); Soo Young Park, Daejeon (KR); Sang Won Suh, Daejeon (KR); Woo-Taek Lim, Daejeon (KR); Minhan Kim, Daegu (KR); Seokjin Lee, Daegu (KR)

(73) Assignees: Electronics and Telecommunications Research Institute, Daejeon (KR); Kyungpook National University Industry-Academic Cooperation Foundation, Daegu (KR)

( * ) Notice: Subject to any disclaimer, the term of this patent is extended or adjusted under 35 U.S.C. 154(b) by 309 days.

(21) Appl. No.: 16/927,691

(22) Filed: Jul. 13, 2020

(65) Prior Publication Data

US 2021/0174252 A1 Jun. 10, 2021

(30) Foreign Application Priority Data

Dec. 10, 2019 (KR) .......................... 10-2019-0163701

(51) Int. Cl.
*G06N 20/00* (2019.01)
*G06F 17/18* (2006.01)

(52) U.S. Cl.
CPC ............. *G06N 20/00* (2019.01); *G06F 17/18* (2013.01)

(58) Field of Classification Search
CPC .................................. G06N 20/00; G06F 17/18
USPC ........................................................... 706/12
See application file for complete search history.

(56) References Cited

U.S. PATENT DOCUMENTS

| 9,275,304 | B2 | 3/2016 | Yoon et al. | |
| 9,875,737 | B2 | 1/2018 | Jung | |
| 10,271,137 | B1* | 4/2019 | Jeong | H04R 3/005 |
| 2019/0005947 | A1 | 1/2019 | Kim et al. | |
| 2019/0087730 | A1* | 3/2019 | Saito | G06N 3/088 |
| 2019/0287550 | A1* | 9/2019 | Lim | G10L 25/30 |
| 2020/0211576 | A1* | 7/2020 | Beack | G06N 3/08 |
| 2020/0302917 | A1* | 9/2020 | Jeong | G06F 40/279 |
| 2020/0302949 | A1* | 9/2020 | Jeong | G06N 3/04 |
| 2020/0312350 | A1* | 10/2020 | Lim | G10L 25/30 |

FOREIGN PATENT DOCUMENTS

KR 1020170107283 A 9/2017

OTHER PUBLICATIONS

Seokjin Lee et al., End-to-End Deep Convolutional Neural Network With Multi-Scale Structure for Weakly Labeled Sound Event Detection, Detection and Classification of Acoustic Scenes and Events 2019.

* cited by examiner

*Primary Examiner* — William D Titcomb
(74) *Attorney, Agent, or Firm* — William Park & Associates Ltd.

(57) ABSTRACT

Disclosed is an apparatus and method for augmenting training data using a notch filter. The method may include obtaining original data, and obtaining training data having a modified frequency component from the original data by filtering the original data using a filter configured to remove a component of a predetermined frequency band.

6 Claims, 11 Drawing Sheets

APPARATUS AND METHOD FOR AUGMENTING TRAINING DATA USING NOTCH FILTER

CROSS-REFERENCE TO RELATED APPLICATION(S)

This application claims the benefit of Korean Patent Application No. 10-2019-0163701, filed on Dec. 10, 2019, in the Korean Intellectual Property Office, the disclosure of which is incorporated herein by reference.

BACKGROUND

1. Field of the Invention

One or more example embodiments relate to an apparatus and method for augmenting training data using a notch filter, and more particularly, to an apparatus and method for augmenting, using a notch filter, training data to be input into a classifier for sound event detection and classification.

2. Description of the Related Art

Machine learning is a technique for training a classifier to classify input information as a specific value. Machine learning is also applied to the sound recognition field to detect sound events.

Existing sound event detection and classification systems using machine learning perform a pattern recognition process to train a classifier for sound event detection and classification using training samples and detect sound events by inputting real sound signals into the trained classifier. However, there is an issue that the recognition rate of the classifier differs according to the diversity and the number of training samples for sound events to be recognized in the pattern recognition process.

Thus, the existing sound event detection and classification systems using machine learning use data augmentation techniques such as block mixing to artificially add noise or to trim and mix audio files. However, the existing data augmentation schemes are incapable of considering a change in an environment where sound signals are collected or a change in a recording device. Thus, when the classifier is applied to equipment having a frequency response different from the training samples, variations in training data decrease the recognition rate.

Accordingly, there is a demand for a method of preventing the recognition rate from decreasing due to insufficient training data or variations in training data.

SUMMARY

An aspect provides an apparatus and method for augmenting training data by transforming original data, thereby preventing the recognition rate of a classifier trained using training data from decreasing due to insufficient training data, and increasing the recognition rate.

Another aspect provides an apparatus and method for augmenting training data by transforming a frequency component or time component of original data, thereby preventing the recognition rate from decreasing due to variations in the training data if a classifier trained using the training data is applied to equipment having a frequency response different from the original data.

According to an aspect, there is provided a method of augmenting training data, the method including obtaining original data, and obtaining training data having a transformed frequency component from the original data by filtering the original data using a filter configured to remove a component of a predetermined frequency band.

The filter may be a notch filter with a center frequency and a bandwidth set to random numbers.

The filter may be configured to filter out a frequency band on a time axis of the original data based on a parameter determined according to a uniform distribution probability variable.

The method may further include obtaining training data having transformed frequency and time components based on the original data by deleting a predetermined range of data on a time axis of the training data having the transformed frequency component.

The obtaining of the training data having the transformed time component may include obtaining the training data having the transformed frequency and time components by determining two points on the time axis of the training data having the transformed frequency component according to a uniform distribution probability variable and by removing signal energy included in an interval between the determined points.

According to another aspect, there is provided a method of augmenting training data, the method including obtaining original data, and obtaining training data having a transformed time component from the original data by deleting a predetermined range of data on a time axis of the original data.

The obtaining of the training data having the transformed time component may include obtaining the training data having the transformed time component by determining two points on the time axis of the original data according to a uniform distribution probability variable and by removing signal energy included in an interval between the determined points.

The method may further include obtaining training data having transformed frequency and time components based on the original data by filtering the training data having the transformed time component using a filter configured to remove a component of a predetermined frequency band.

The filter may be configured to filter out a frequency band of the training data having the transformed time component based on a parameter determined according to a uniform distribution probability variable.

According to another aspect, there is provided a method of training a classifier, the method including generating a random number, augmenting training data by transforming input data and generating an estimate for a ground truth by inputting the augmented training data into a classifier, if the random number exceeds a threshold, generating an estimate for the ground truth by inputting the input data into the classifier, if the random number is less than or equal to the threshold, calculating a loss function by comparing the estimate for the ground truth to a real ground truth included in the input data, and updating a parameter of the classifier using the loss function.

The augmenting of the training data may include obtaining training data having a transformed frequency component from the original data by filtering the original data using a filter configured to remove a component of a predetermined frequency band.

The filter may be configured to filter out a frequency band on a time axis of the original data based on a parameter determined according to a uniform distribution probability variable.

The augmenting of the training data may include obtaining training data having a transformed time component from the original data by deleting a predetermined range of data on a time axis of the original data.

The augmenting of the training data may include obtaining the training data having the transformed time component by determining two points on the time axis of the original data according to a uniform distribution probability variable and by removing signal energy included in an interval between the determined points.

According to another aspect, there is provided an apparatus for augmenting training data, the apparatus including an input interface configured to obtain original data, a filter configured to remove a component of a predetermined frequency band from the received original data, and a processor configured to obtain training data having a transformed frequency component from the original data by filtering the original data using the filter.

The filter may be a notch filter with a center frequency and a bandwidth set to random numbers.

The processor may be configured to obtain training data having transformed frequency and time components based on the original data by deleting a predetermined range of data on a time axis of the training data having the transformed frequency component.

According to example embodiments, it is possible to augment training data by transforming original data, thereby preventing the recognition rate of a classifier trained using training data from decreasing due to insufficient training data, and increasing the recognition rate.

According to example embodiments, it is possible to augment training data by transforming a frequency component or time component of original data, thereby preventing the recognition rate from decreasing due to variations in the training data if a classifier trained using the training data is applied to equipment having a frequency response different from the original data.

According to example embodiments, it is possible to increase the diversity and the number of training data using original data, thereby, since there is no need for increasing original data collection to increase the number of training data, reducing costs for increasing original data collection.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
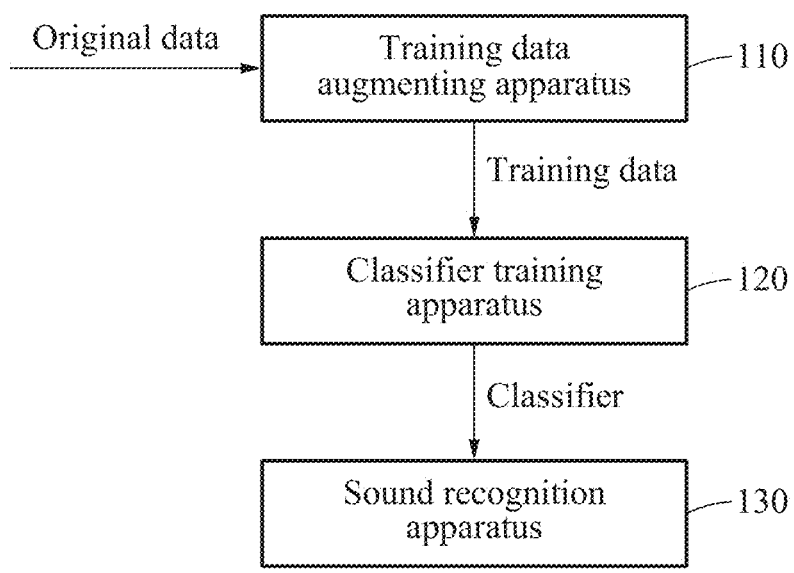
FIG. 1 illustrates a sound event detection and classification system including a training data augmenting apparatus according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 illustrates a sound event detection and classification system including a training data augmenting apparatus according to an example embodiment.

Referring to FIG. 1, a sound event detection and classification system may include a training data augmenting apparatus 110, a classifier training apparatus 120, and a sound recognition apparatus 130.

The training data augmenting apparatus 110 may augment training data by transforming a frequency component or a time component of original data. In this example, the training data augmenting apparatus 110 may transform the frequency component of the original data using a notch filter, or transform the time component by deleting predetermined data on a time axis of the original data. For example, the original data may be training data that is set for sound event detection and classification. Further, the frequency component of the original data may be a value on a frequency axis of the original data, and the time component of the original data may be a value on a time axis of the original data.

In addition, an augmented training data set may include at least one of the original data, the training data having a transformed frequency or time component, or the training data having transformed frequency and time components.

The configuration and operation of the training data augmenting apparatus 110 will be described in detail below with reference to FIG. 2.

The classifier training apparatus 120 may train a classifier for sound event detection and classification, using the training data set augmented by the training data augmenting apparatus 110.

Further, the classifier training apparatus 120 may include an element to augment the training data, and may train the classifier by augmenting the training data in real time according to conditions. In this example, since the training data is augmented inside the classifier training apparatus 120, the sound event detection and classification system may include the classifier training apparatus 120 and the sound recognition apparatus 130.

The configuration and operation of the classifier training apparatus 120 will be described in detail below with reference to FIG. 8.

The sound recognition apparatus 130 may receive the trained classifier from the classifier training apparatus 120. The sound recognition apparatus 130 may detect and classify a sound event included in an input signal by inputting the input signal into the classifier.

According to example embodiments, it is possible to augment training data by transforming original data, thereby preventing the recognition rate of a classifier trained using training data from decreasing due to insufficient training data, and increasing the recognition rate.

According to example embodiments, it is possible to augment training data by transforming a frequency component or time component of original data, thereby preventing the recognition rate from decreasing due to variations in the training data if a classifier trained using the training data is applied to equipment having a frequency response different from the original data.

That is, it is possible to increase the diversity and the number of training data using original data, thereby, since there is no need for increasing original data collection to increase the number of training data, reducing costs for increasing original data collection.

Figure 2:
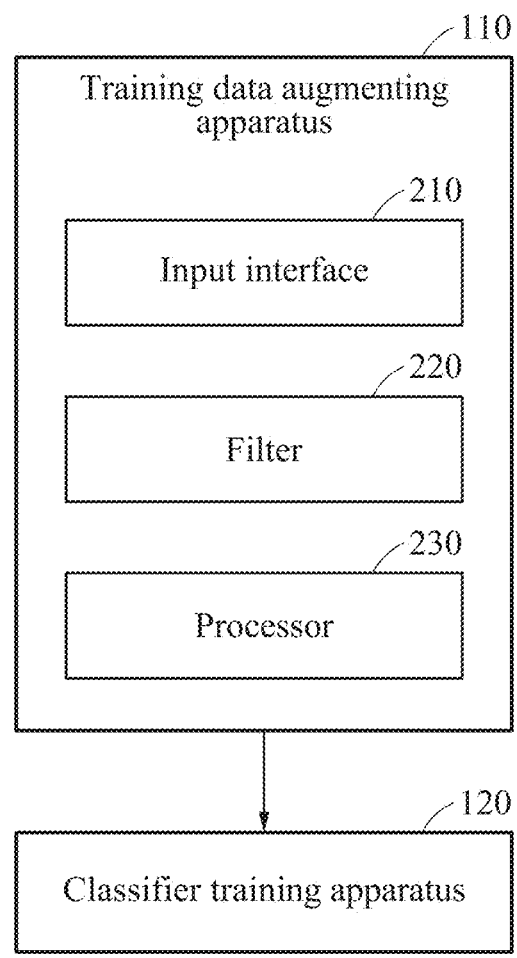
FIG. 2 illustrates a training data augmenting apparatus according to an example embodiment.

FIG. 2 illustrates a training data augmenting apparatus according to an example embodiment.

Referring to FIG. 2, the training data augmenting apparatus 110 may include an input interface 210, a filter 220, and a processor 230.

The input interface 210 is an interface for obtaining original data, and may be one of an element for receiving the original data from the outside, such as a communication device or a port, and an input device for receiving the original data from a user.

The filter 220 may remove a component of a predetermined frequency band of the original data by filtering out a frequency band on a time axis of the original data based on a parameter determined according to a uniform distribution probability variable. For example, the filter may be a notch filter with a center frequency and a bandwidth set to random numbers.

The processor 230 may obtain training data having a transformed frequency component from the original data by filtering the original data received through the input interface 210 using the filter 220.

Further, the processor 230 may obtain training data having a transformed time component from the original data by deleting a predetermined range of data on a time axis of the original data.

In the case of a sound recognition system, the frequency characteristics of the training data and the frequency characteristics of a real environment are different due to environmental factors such as the frequency characteristics and the spatial transmission characteristics of an input device. Thus, a classifier trained using the training data may perform classification differently in a real environment.

The training data augmenting apparatus 110 may augment the training data by transforming the frequency and time components of the original data for training, thereby preventing the recognition rate of the classifier from decreasing even in a real environment having frequency characteristics different from those of the original data for training.

In addition, the training data augmenting apparatus 110 may enable the augmentation of the training data to be all performed on the time axis, in preparation for a case where input data is not a feature vector but a time-axis signal, for example, as in an end-to-end sound recognition classifier.

Figure 3:
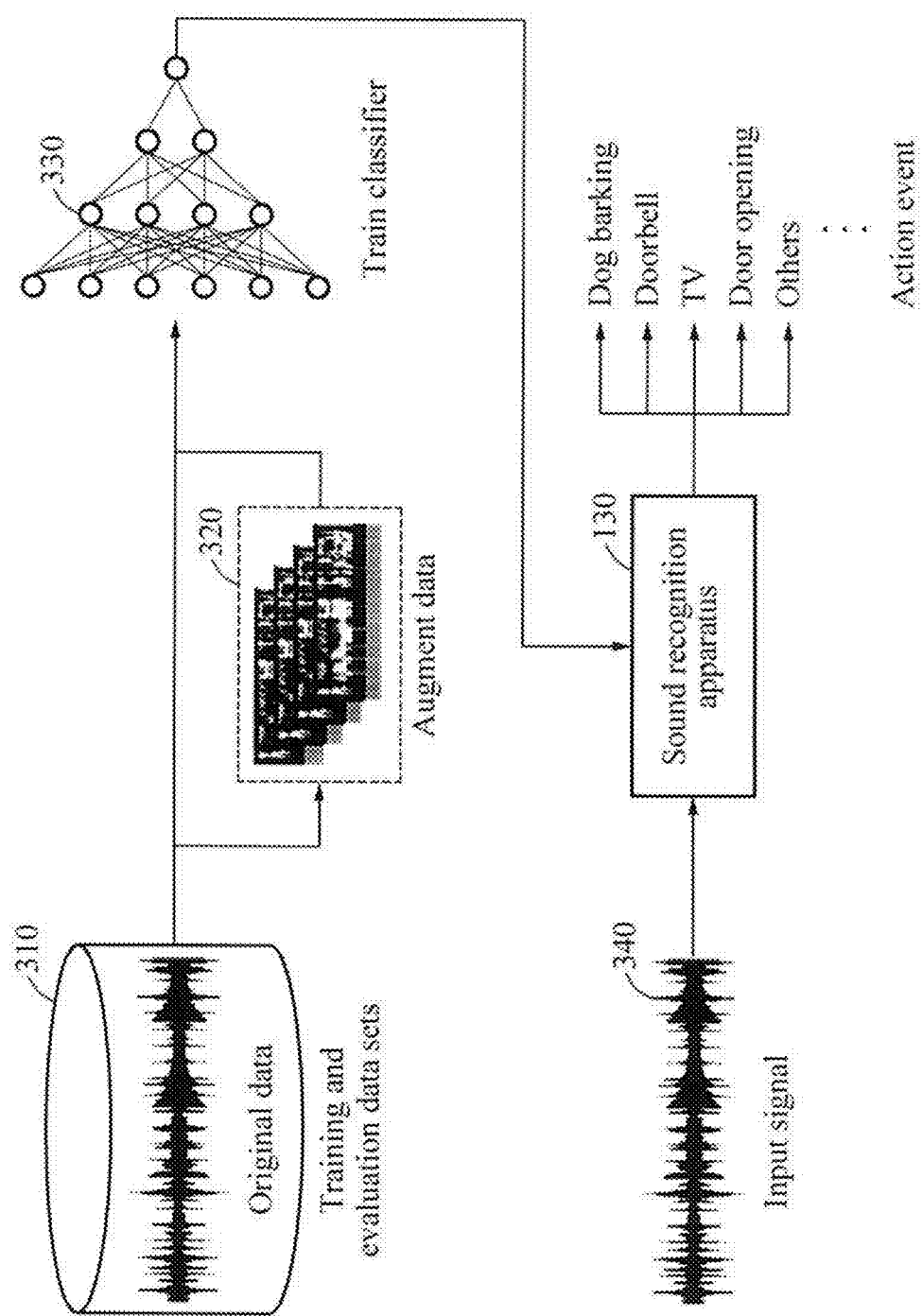
FIG. 3 illustrates an operation of a sound event detection and classification system according to an example embodiment.

FIG. 3 illustrates an operation of a sound event detection and classification system according to an example embodiment.

The training data augmenting apparatus 110 may augment training data by transforming a frequency component or a time component of original data 310. For example, the original data may be a training data set, an evaluation data set, or a data set for training that is set for sound event detection and classification.

In this example, the training data augmenting apparatus 110 may transform the frequency component of the original data using a notch filter, or transform the time component by deleting predetermined data on a time axis of the original data. In addition, the training data augmenting apparatus 110 may transform a time component of the original data having the transformed frequency component, or transform a frequency component of the original data having the transformed time component.

The classifier training apparatus 120 may train a classifier 330 for sound event detection and classification using an augmented training data set 320. For example, the classifier 330 may be an end-to-end sound classifier.

The sound recognition apparatus 130 may detect and classify a sound event included in an input signal 340 by inputting the input signal 340 into the classifier 330. In this example, the input signal 340 may be a sound signal collected in a real environment.

Figure 4:
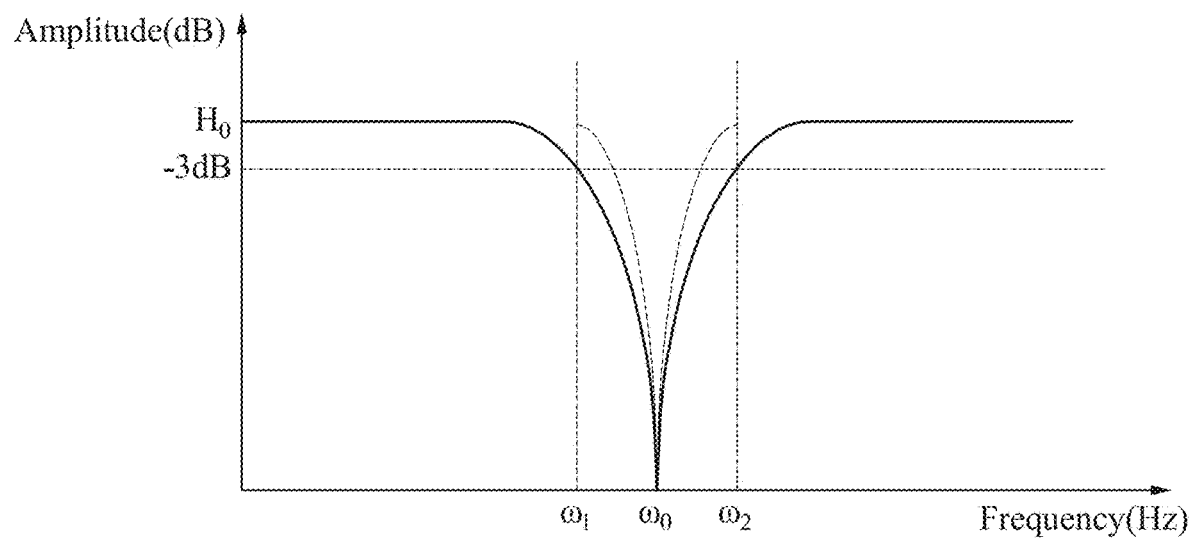
FIG. 4 illustrates an example of a frequency characteristic of a notch filter according to an example embodiment.

FIG. 4 illustrates an example of a frequency characteristic of a notch filter according to an example embodiment.

A notch filter included in the training data augmenting apparatus 110 may have frequency characteristics as shown in FIG. 4, and a transfer function H(s) representing the frequency characteristics of the notch filter on an S-plane may be expressed by Equation 1.

$$H(s) = \frac{s^2 + \omega_0^2}{s^2 + \frac{\omega_0}{Q}s + \omega_0^2} \qquad \text{[Equation 1]}$$

In Equation 1, $\omega_0$, a parameter that determines the characteristics of the notch filter, denotes a center frequency, and $$Q = \frac{\omega_0}{\omega_2 - \omega_1}$$

may be satisfied. In addition, if s=jω, H(s) may be Y(jω) which is a frequency response output from the notch filter with respect to the input signal X(jω) in the frequency domain input into the notch filter.

In this example, if the value of Q increases, the width of the frequency band in which the notch filter removes a component from the signal may decrease. In addition, if the value of Q decreases, the width of the frequency band in which the notch filter removes a component from the signal may increase.

The processor 230 may determine the values of the parameters $\omega_0$ and Q of the notch filter using a uniform distribution probability variable having the probability distribution as shown in FIG. 4.

The notch filter designed with the determined parameters $\omega_0$ and Q may output an output signal y(n) by filtering the input signal x(n) which is the original data input into the notch filter. In this example, the output signal y(n) may be expressed through a convolution operation (*) between the input signal x(n) and an impulse response h(n) of the notch filter, as expressed by Equation 2.

$$y(n)=h(n)*x(n) \quad \text{[Equation 2]}$$

In Equation 2, the output signal y(n) is training data having the transformed frequency component obtained by removing a component of a predetermined frequency band through the notch filter, and n denotes a discrete signal (digital signal).

In the frequency domain, Y(jω) may be obtained by multiplying the frequency response H(jω) of the notch filter by X(jω) obtained by performing discrete Fourier transform (DFT) on the input signal x(n). In addition, if inverse DFT is performed on Y(jw), y(n) which is a time domain signal can be obtained.

Figure 6:
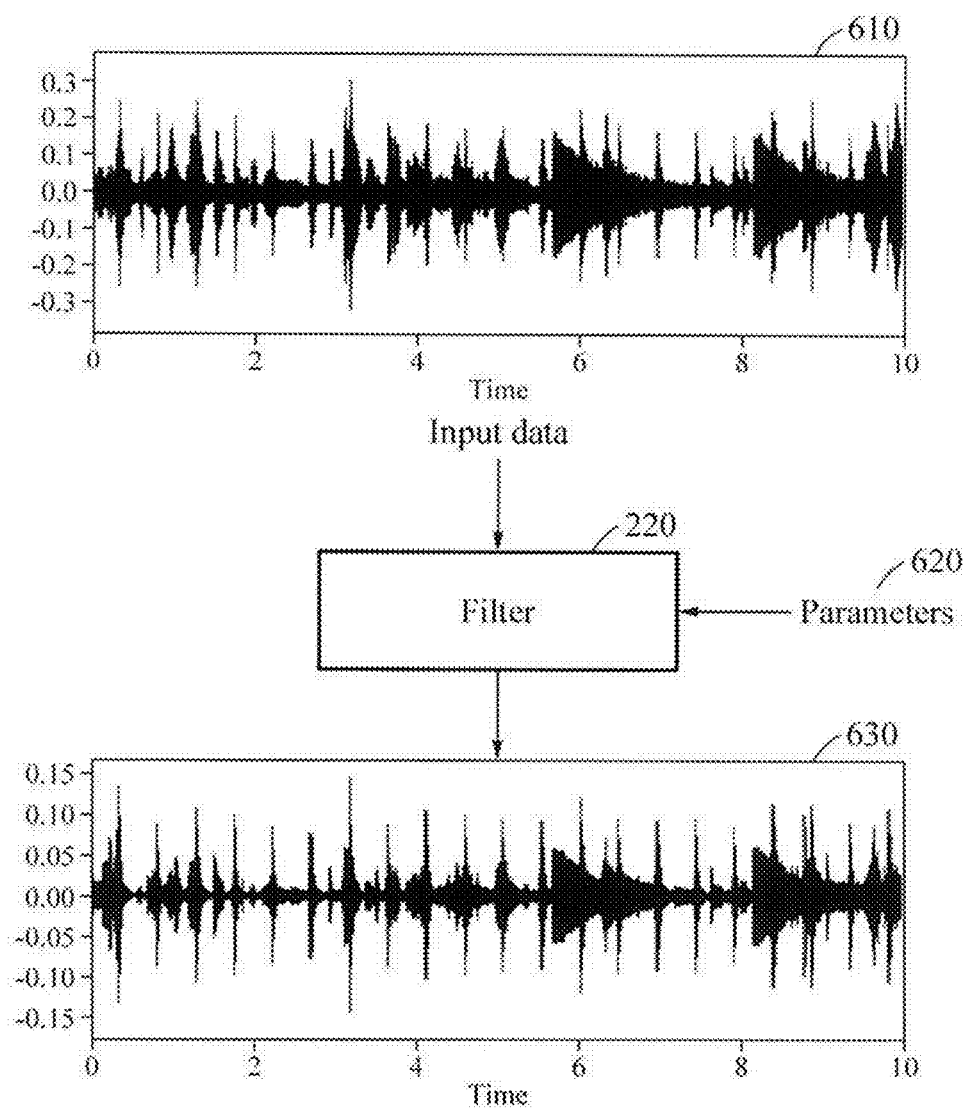
FIG. 6 illustrates an example of an operation of a notch filter according to an example embodiment.

FIG. 6 illustrates an example of an operation of a notch filter according to an example embodiment.

Referring to FIG. 6, the filter 220 may receive input data 610 and parameters 620 determined by the processor 230. Also, the filter 220 may output training data 630 having a transformed frequency component by filtering the input data 610. In this example, the operation of inputting the input data 610 into the filter 220, the filtering operation of the filter 220, and the operation of the filter 220 outputting the training data 630 having the transformed frequency component may be all performed on a time axis.

In detail, the filter 220 may output an output signal y(n) through a convolution operation of the input signal x(n) in the time domain and the impulse response h(n) of the notch filter, as expressed by Equation 2. In this example, when analyzing the spectrogram of Y(jw) obtained through short-time Fourier transform (STFT) on the signal y(n), it may be learned that a predetermined frequency component is removed by notch filtering.

Figure 7:
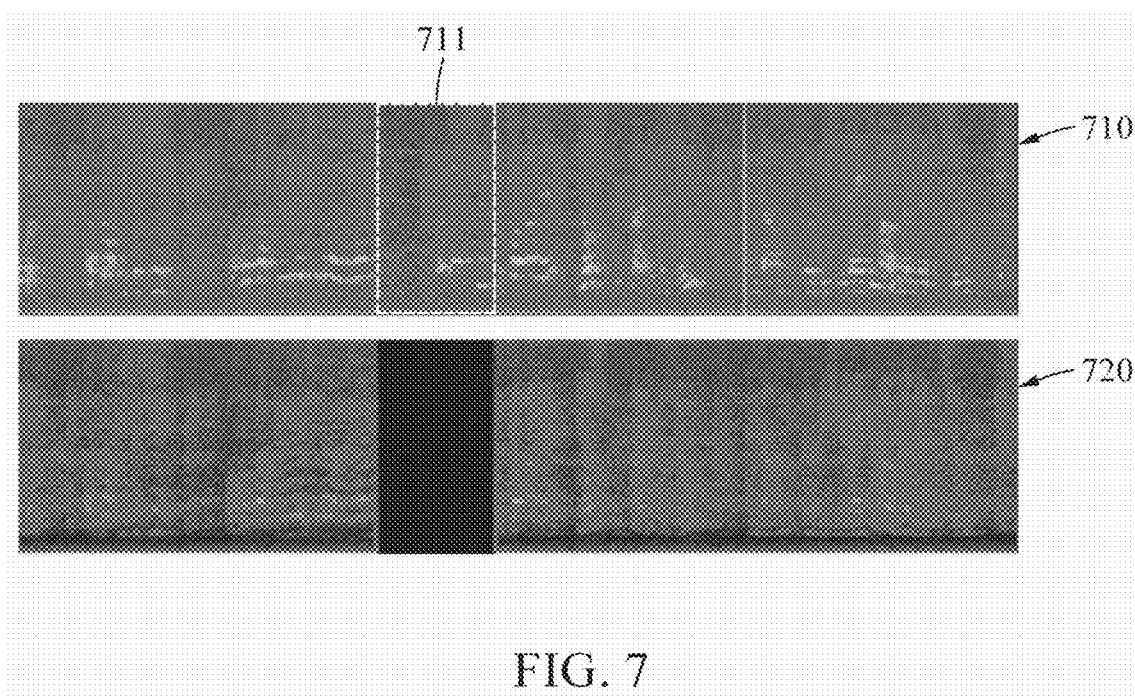
FIG. 7 illustrates an example of obtaining training data having transformed frequency and time components according to an example embodiment.

FIG. 7 illustrates an example of obtaining training data having transformed frequency and time components according to an example embodiment.

Time masking used by the processor 230 to obtain training data having a transformed time component from original data may be a process of making it zero by removing signal energy of a predetermined interval on a time axis of the original data.

Figure 5:
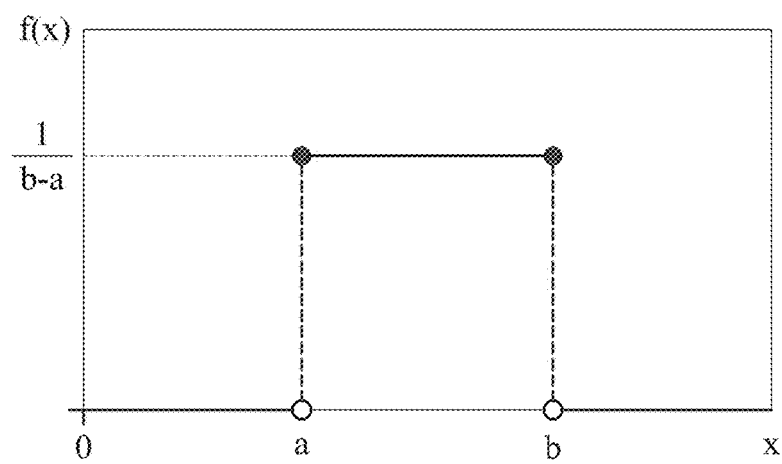
FIG. 5 illustrates an example of a uniform distribution probability density function used to determine a parameter of a notch filter according to an example embodiment.

In this example, the processor 230 may determine a start point and an end point of the interval to remove energy using the uniform distribution probability variable as shown in FIG. 5. For example, the processor 230 may determine an interval 711 to remove energy, in original data 710.

In addition, the processor 230 may generate training data having transformed frequency and time components, by applying the notch filter to the original data 710 and then removing the energy included in the interval 711 on the time axis. For example, in FIG. 7, parameters of the notch filter used by the processor 230 may be ω_0=0.0227 (the center frequency of 700 Hz) and Q=0.01, and the interval 711 may be an interval between 3.5 seconds and 4.7 seconds.

Figure 8:
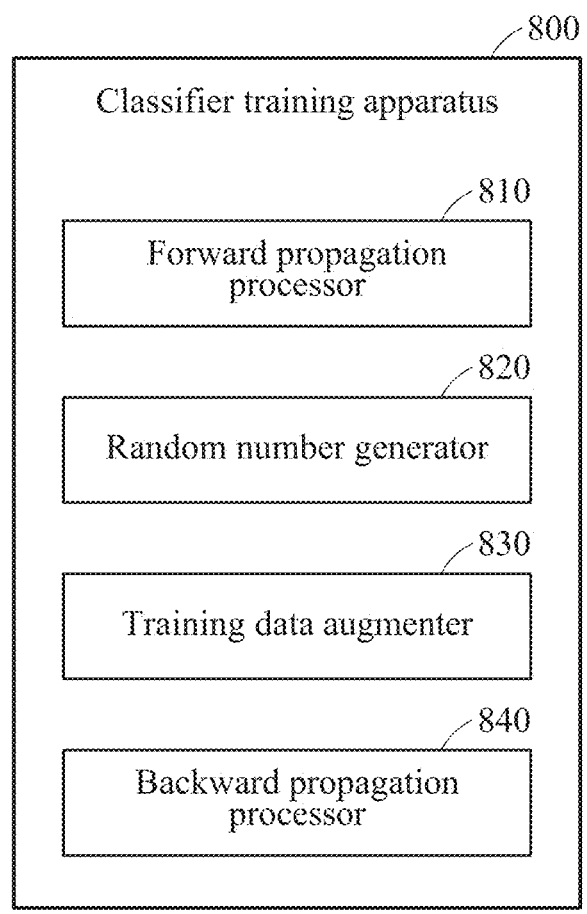
FIG. 8 illustrates a classifier training apparatus according to an example embodiment.

FIG. 8 illustrates a classifier training apparatus according to an example embodiment.

Referring to FIG. 8, a classifier training apparatus 800 for training a classifier by augmenting training data in real time according to conditions may include a forward propagation processor 810, a random number generator 820, a training data augmenter 830, and a backward propagation processor 840. In this example, the forward propagation processor 810, the random number generator 820, the training data augmenter 830, and the back propagation processor 840 may be different processors, or separate modules included in a program executed by a single processor.

The forward propagation processor 810 may generate an estimate for a ground truth by inputting input data into a classifier.

The random number generator 820 may generate a random number.

If the random number generated by the random number generator 820 exceeds a threshold, the training data augmenter 830 may augment training data by transforming the input data. In this example, the training data augmenter 830 may include the filter 220 and the processor 230 shown in FIG. 2, and may augment the training data by transforming the input data according to the operation of the filter 220 and the operation of the processor 230. In addition, the forward propagation processor 810 may generate an estimate for the ground truth by inputting the augmented training data into the classifier.

The backward propagation processor 840 may calculate a loss function if the random number generated by the random number generator 820 is less than or equal to the threshold. In addition, the backward propagation processor 840 may update parameters of the classifier using the loss function and the estimate for the ground truth generated by the forward propagation processor 810.

Figure 9:
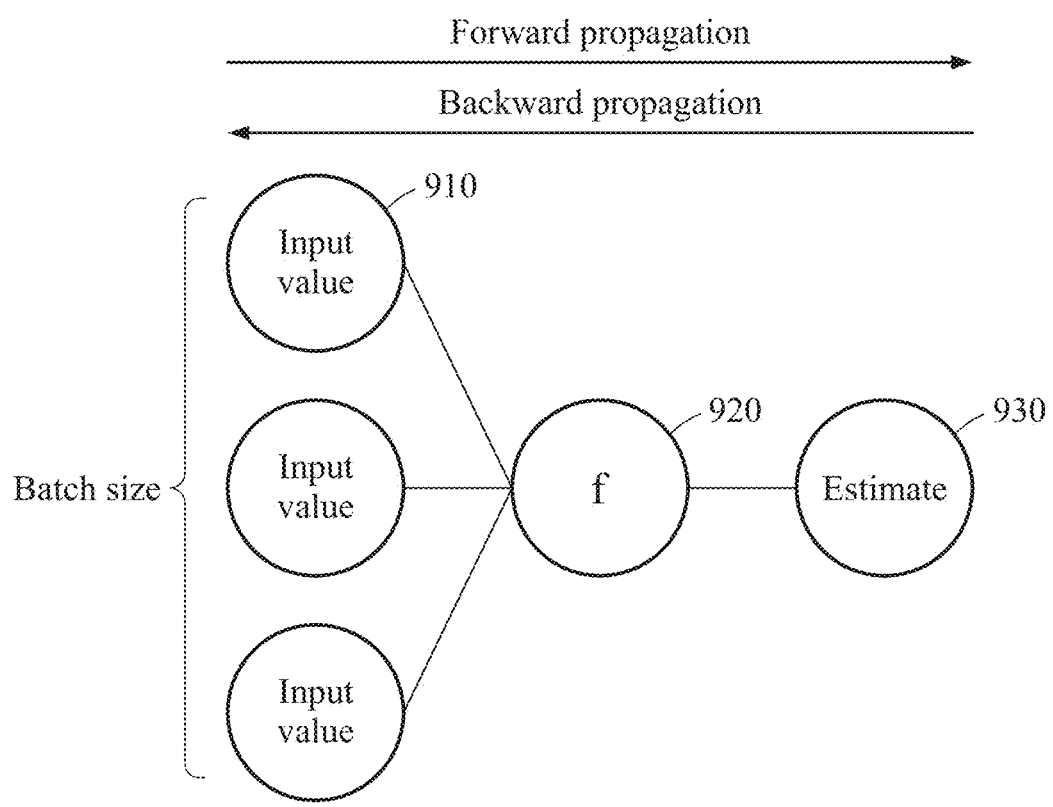
FIG. 9 illustrates an example of training a classifier according to an example embodiment.

FIG. 9 illustrates an example of training a classifier according to an example embodiment.

Referring to FIG. 9, input data used by the classifier training apparatus 800 may include input values 910 which are sound signals including sound events, and a real ground truth with respect to the sound events included in the input values 910. In addition, the number of input values 910 input at a time by the classifier training apparatus 800 to train a classifier may be the batch size.

Further, a process of the classifier training apparatus 800 calculating an estimate 930 for a ground truth by inputting the input values 910 into a classifier 920 may be defined as forward propagation. A process of the classifier training apparatus 800 calculating a loss function by comparing the estimate 930 to the real ground truth included in the input data, and updating a parameter of the classifier 920 according to the loss function may be defined as backward propagation.

In this example, the classifier training apparatus 800 may selectively augment the training data by determining in real time whether to augment the training data in the forward propagation process. In detail, the classifier training apparatus 800 may generate a random number and augment the training data if the generated random number exceeds a preset threshold.

Figure 10:
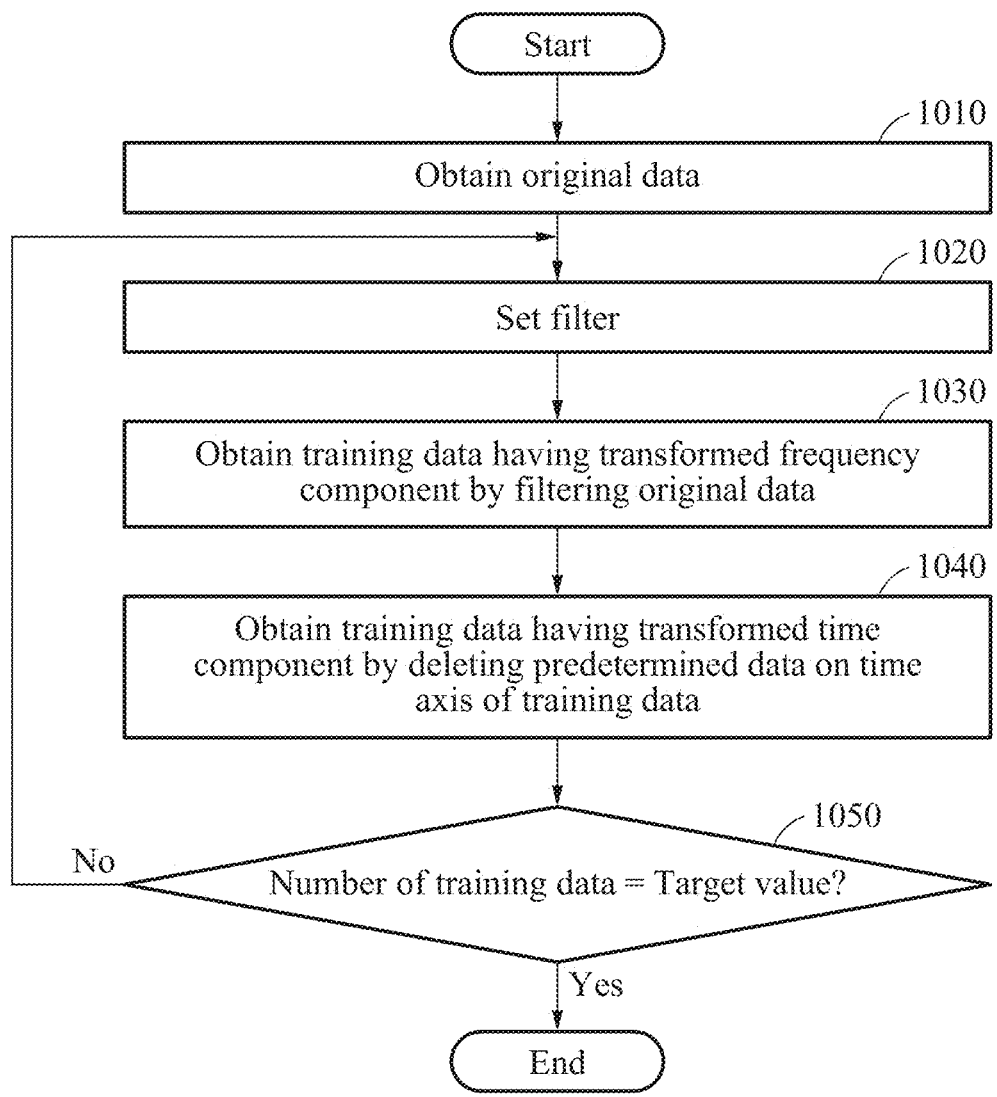
FIG. 10 is a flowchart illustrating a training data augmenting method according to an example embodiment.

FIG. 10 is a flowchart illustrating a training data augmenting method according to an example embodiment.

Referring to FIG. 10, in operation 1010, the input interface 210 may obtain original data.

In operation 1020, the processor 230 may determine the values of parameters $\omega_0^{\omega_0}$ and $Q^Q$ of a notch filter using a uniform distribution probability variable as shown in FIG. 5. In this example, the notch filter may be a filter with a center frequency and a bandwidth set to random numbers.

In operation 1030, the processor 230 may obtain training data having a transformed frequency component from the original data by filtering the original data obtained in operation 1010 using the notch filter having the parameters determined in operation 1020.

In operation 1040, the processor 230 may obtain training data having transformed frequency and time components based on the original data by deleting a predetermined range of data on a time axis of the training data having the transformed frequency component obtained in operation 1030. In this example, the processor 230 may obtain the training data having transformed frequency and time components based on the original data by determining two points on the time axis of the training data having the transformed frequency component according to a uniform distribution probability variable and by removing signal energy included in an interval between the determined points.

In operation 1050, the processor 230 may determine whether the number of training data obtained in operation 1040 is equal to a preset target value. If the number of training data is equal to the preset target value, the processor 230 may terminate the training data augmenting method. Conversely, if the number of training data is less than the preset target value, the processor 230 may repeat operations 1020 to 1040 until the number of training data is equal to the preset target value.

Depending on an example, the processor 230 may first perform operation 1040 and then perform operation 1030. In this example, the processor 230 may obtain training data having a transformed time component from the original data by deleting a predetermined range of data on the time axis of the original data. In addition, the processor 230 may obtain training data having transformed frequency and time components based on the original data by filtering the training data having the transformed time component using the notch filter.

Figure 11:
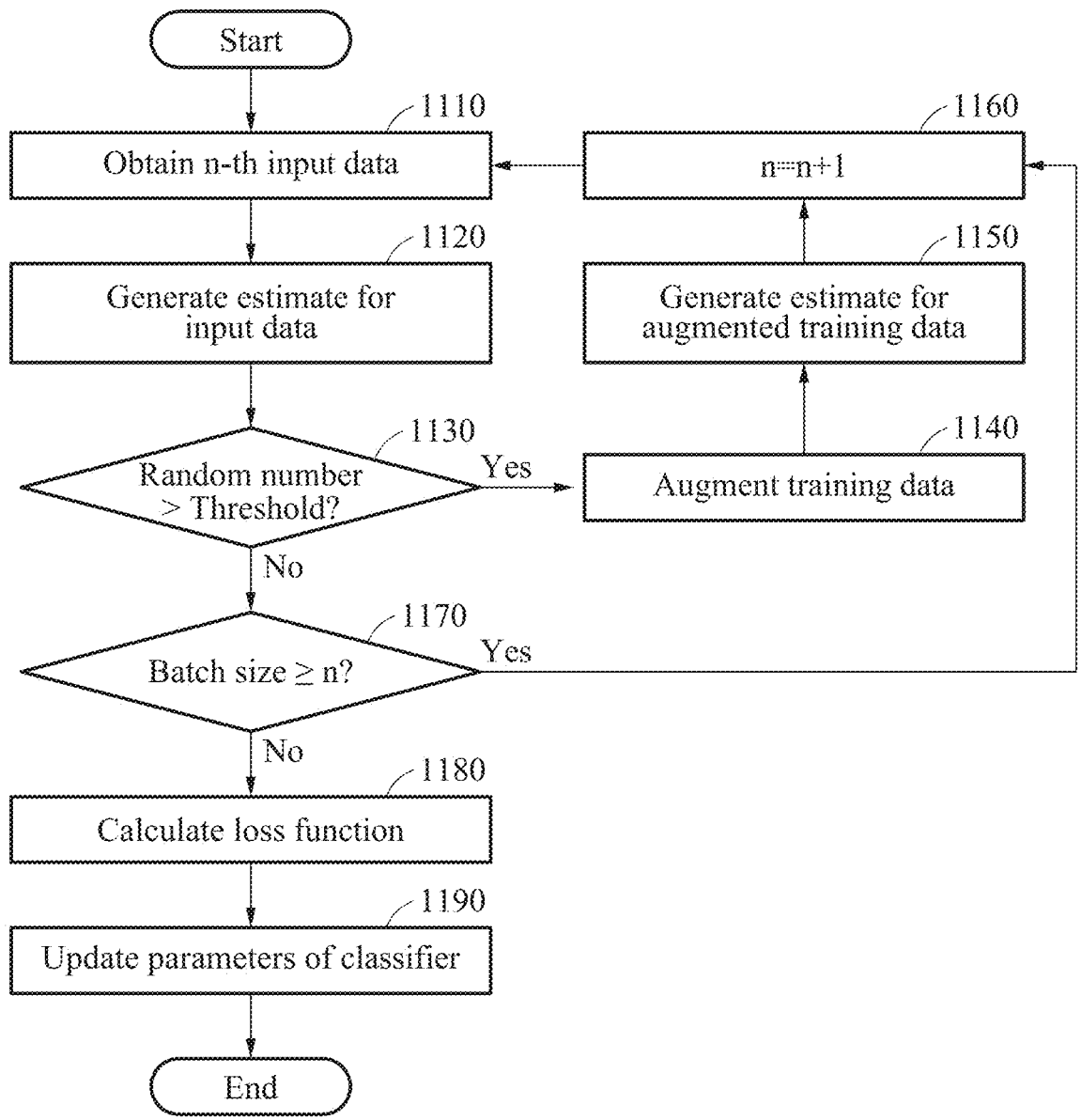
FIG. 11 is a flowchart illustrating a classifier training method using a training data set with an increased batch size according to an example embodiment.

FIG. 11 is a flowchart illustrating a classifier training method using a training data set with an increased batch size according to an example embodiment.

Referring to FIG. 11, in operation 1110, the forward propagation processor 810 may obtain n-th input data.

In operation 1120, the forward propagation processor 810 may generate an estimate for a ground truth of the n-th input data by inputting the n-th input data obtained in operation 1110 into a classifier. In this example, the random number generator 820 may generate a random number.

In operation 1130, the forward propagation processor 810 may determine whether the random number generated in operation 1120 exceeds a threshold. If the random number exceeds the threshold, the forward propagation processor 810 may request the training data augmenter 830 to augment the training data, in operation 1140. If the random number is less than or equal to the threshold, the forward propagation processor 810 may perform operation 1170.

In operation 1140, the training data augmenter 830 may augment the training data by transforming the n-th input data obtained in operation 1110. In detail, the training data augmenter 830 may generate n-th input data having transformed frequency and time components by transforming a frequency component of the n-th input data using a notch filter, and deleting a predetermined range of data on a time axis of the n-th input data having the transformed frequency component. Further, the training data augmenter 830 may augment a training data set by adding the n-th input data having the transformed frequency and time components to the training data set as augmented training data.

In operation 1150, the forward propagation processor 810 may generate an estimate for a ground truth of the augmented training data by inputting the training data augmented in operation 1140 into the classifier.

In operation 1160, the forward propagation processor 810 may change the value of n to n+1 such that (n+1)-th input data may be obtained in operation 1110.

In this example, although n is increased by 1, the training data set may include the estimate generated in operation 1120 and the estimate generated in operation 1150. That is, the augmented training data may be added between the n-th input data and the (n+1)-th input data. Thus, the batch size of the training data may increase in proportion to the number of times operations 1140 to 1160 are performed.

In operation 1170, the forward propagation processor 810 may determine whether the value of n is greater than or equal to the batch size that is input at a time to train the classifier. If the value of n is less than or equal to the batch size, the forward propagation processor 810 may repeat operations 1010 to 1060 until the value of n exceeds the batch size. If the value of n exceeds the batch size, the forward propagation processor 810 may request the backward propagation processor 840 to perform operation 1180.

In operation 1180, the backward propagation processor 840 may calculate a loss function by comparing the estimate generated in operation 1120 or 1150 to a real ground truth included in the input data.

In operation 1190, the backward propagation processor 840 may update the parameters of the classifier using the loss function calculated in operation 1180.

Figure 12:
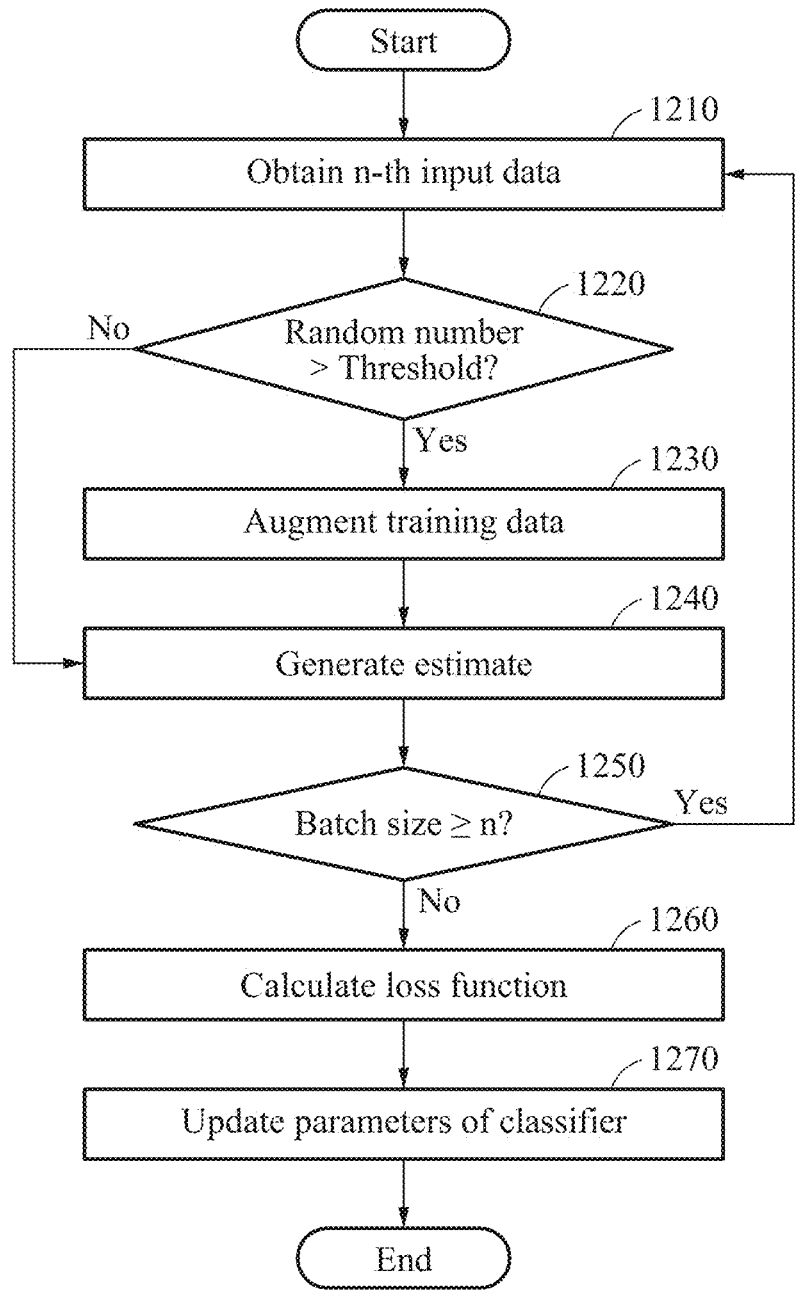
FIG. 12 is a flowchart illustrating a classifier training method using a training data set with a fixed batch size according to an example embodiment.

FIG. 12 is a flowchart illustrating a classifier training method using a training data set with a fixed batch size according to an example embodiment.

Referring to FIG. 12, in operation 1210, the forward propagation processor 810 may obtain n-th input data. In this example, the random number generator 820 may generate a random number.

In operation 1220, the forward propagation processor 810 may determine whether the random number generated in operation 1210 exceeds a threshold. If the random number exceeds the threshold, the forward propagation processor 810 may request the training data augmenter 830 to augment the training data, in operation 1230. If the random number is less than or equal to the threshold, the forward propagation processor 810 may perform operation 1240.

In operation 1230, the training data augmenter 830 may augment the training data by transforming the n-th input data obtained in operation 1210. In detail, the training data augmenter 830 may generate n-th input data having transformed frequency and time components by transforming a frequency component of the n-th input data using a notch filter, and deleting a predetermined range of data on a time axis of the n-th input data having the transformed frequency component. Further, the training data augmenter 830 may augment a training data set by adding the n-th input data having the transformed frequency and time components to the training data set as augmented training data.

In operation 1240, the forward propagation processor 810 may generate an estimate for a ground truth of the augmented training data by inputting the training data augmented in operation 1230 into the classifier. Further, if the random number is less than or equal to the threshold, the forward propagation processor 810 may generate an estimate for a ground truth of the n-th input data by inputting the n-th input data obtained in operation 1210 into a classifier.

In this example, the forward propagation processor 810 is generating one of the estimate for the ground truth of the augmented training data and the estimate for the ground truth of the n-th input data according to whether the random number is less than or equal to the threshold, and thus the number of data included in a training data set may not increase.

In operation 1250, the forward propagation processor 810 may determine whether the value of n is greater than or equal to the batch size that is input at a time to train the classifier. If the value of n is less than or equal to the batch size, the forward propagation processor 810 may repeat operations 1210 to 1240 until the value of n exceeds the batch size. If the value of n exceeds the batch size, the forward propagation processor 810 may request the backward propagation processor 840 to perform operation 1260.

In operation 1260, the backward propagation processor 840 may calculate a loss function by comparing the estimate generated in operation 1240 to a real ground truth included in the input data.

In operation 1270, the backward propagation processor 840 may update the parameters of the classifier using the loss function calculated in operation 1260.

According to example embodiments, it is possible to augment training data by transforming original data, thereby preventing the recognition rate of a classifier trained using training data from decreasing due to insufficient training data, and increasing the recognition rate.

According to example embodiments, it is possible to augment training data by transforming a frequency component or time component of original data, thereby preventing the recognition rate from decreasing due to variations in the training data if a classifier trained using the training data is applied to equipment having a frequency response different from the original data.

That is, it is possible to increase the diversity and the number of training data using original data, thereby, since there is no need for increasing original data collection to increase the number of training data, reducing costs for increasing original data collection.

Meanwhile, the training data augmenting apparatus or the training data augmenting method may be written as a program to be executed on a computer and may be implemented as various recording media such as a magnetic storage medium, an optical reading medium, and a digital storage medium.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The implementations of the various technologies described in the specification may be implemented with a digital electronic circuit, computer hardware, firmware, software, or the combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. The computer programs such as the above-described computer program(s) may be recorded in any form of a programming language including compiled or interpreted languages, and may be executed as a standalone program or in any form included as another unit suitable to be used in a module, component, sub routine, or a computing environment. The computer program may be executed to be processed on a single computer or a plurality of computers at one site or to be distributed across a plurality of sites and then interconnected by a communication network.

The processors suitable to process a computer program include, for example, both general purpose and special purpose microprocessors, and any one or more processors of a digital computer of any kind. Generally, the processor may receive instructions and data from a read only memory, a random access memory or both of a read only memory and a random access memory. The elements of a computer may include at least one processor executing instructions and one or more memory devices storing instructions and data. In general, a computer may include one or more mass storage devices storing data, such as a magnetic disk, a magneto-optical disc, or an optical disc or may be coupled with them so as to receive data from them, to transmit data to them, or to exchange data with them. For example, information carriers suitable to embody computer program instructions and data include semiconductor memory devices, for example, magnetic Media such as hard disks, floppy disks, and magnetic tapes, optical Media such as compact disc read only memory (CD-ROM), and digital video disc (DVD), magneto-optical media such as floppy disks, ROM, random access memory (RAM), flash memory, erasable programmable ROM (EPROM), electrically erasable programmable ROM (EEPROM), and the like. The processor and the memory may be supplemented by a special purpose logic circuit or may be included by the special purpose logic circuit.

Furthermore, the computer-readable medium may be any available medium capable of being accessed by a computer and may include a computer storage medium.

Although the specification includes the details of a plurality of specific implementations, it should not be understood that they are restricted with respect to the scope of any invention or claimable matter. On the contrary, they should be understood as the description about features that may be specific to the specific example embodiment of a specific invention. Specific features that are described in this specification in the context of respective example embodiments may be implemented by being combined in a single example embodiment. On the other hand, the various features described in the context of the single example embodiment may also be implemented in a plurality of example embodiments, individually or in any suitable sub-combination. Furthermore, the features operate in a specific combination and may be described as being claimed. However, one or more features from the claimed combination may be excluded from the combination in some cases. The claimed combination may be changed to sub-combinations or the modifications of sub-combinations.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous. Moreover, the separation of the various device components of the above-described example embodiments should not be understood as requiring such the separation in all example embodiments, and it should be understood that the described program components and devices may generally be integrated together into a single software product or may be packaged into multiple software products.

In the meantime, example embodiments of the present invention disclosed in the specification and drawings are simply the presented specific example to help understand an example embodiment of the present invention and not intended to limit the scopes of example embodiments of the present invention. It is obvious to those skilled in the art that other modifications based on the technical idea of the present invention may be performed in addition to the example embodiments disclosed herein.

What is claimed is:

1. A method of augmenting training data, the method comprising:
   obtaining, via an input interface, original data;
   obtaining, via a processor coupled to the input interface, training data having a transformed frequency component from the original data by filtering the original data; and
   obtaining training data having transformed frequency and time components based on the original data by deleting a predetermined range of data on a time axis of the training data having the transformed frequency component,
   wherein a filter coupled to the processor is configured to remove a component of a predetermined frequency band, and
   wherein the obtaining of the training data having the transformed time component comprises obtaining the training data having the transformed frequency and time components by determining two points on the time axis of the training data having the transformed frequency component according to a uniform distribution probability variable and by removing signal energy included in an interval between the determined points.

2. The method of claim 1,
wherein the filter is a notch filter with a center frequency and a bandwidth set to random numbers.

3. The method of claim 1,
wherein the filter is configured to filter out a frequency band on a time axis of the original data based on a parameter determined according to a uniform distribution probability variable.

4. A method of augmenting training data, the method comprising:
   obtaining, via an input interface, original data; and
   obtaining, via a processor coupled to the input interface, training data having a transformed time component from the original data by deleting a predetermined range of data on a time axis of the original data,
   wherein the obtaining of the training data having the transformed time component comprises obtaining the training data having the transformed time component by determining two points on the time axis of the original data according to a uniform distribution probability variable and by removing signal energy included in an interval between the determined points.

5. The method of claim 4, further comprising:
obtaining training data having transformed frequency and time components based on the original data by filtering the training data having the transformed time component using a filter configured to remove a component of a predetermined frequency band.

6. The method of claim 5,
wherein the filter is configured to filter out a frequency band of the training data having the transformed time component based on a parameter determined according to a uniform distribution probability variable.

* * * * *